(12) United States Patent
Yen et al.

(10) Patent No.: US 6,724,918 B1
(45) Date of Patent: Apr. 20, 2004

(54) SYSTEM AND METHOD FOR INDEXING, ACCESSING AND RETRIEVING AUDIO/VIDEO WITH CONCURRENT SKETCH ACTIVITY

(75) Inventors: Samuel Yen, Mountain View, CA (US); Renate Fruchter, Los Altos, CA (US); Larry Leifer, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 09/568,090

(22) Filed: May 9, 2000

Related U.S. Application Data

(60) Provisional application No. 60/133,782, filed on May 12, 1999.

(51) Int. Cl.[7] .................................................. G06K 9/00
(52) U.S. Cl. ..................... 382/113; 707/104.1; 345/866; 348/14.02
(58) Field of Search ................................. 382/113, 100, 382/119, 179, 168, 187; 379/487, 93.19, 93.08; 709/205; 723/90; 704/231; 715/512, 500.1; 348/14.09, 14.02; 707/104.1; 345/866; 700/146

(56) References Cited

U.S. PATENT DOCUMENTS

| 5,564,005 A | * | 10/1996 | Weber et al. ............... 345/863 |
| 5,608,859 A | | 3/1997 | Taguchi ....................... 395/792 |
| 5,675,752 A | | 10/1997 | Scott et al. .................. 395/333 |
| 5,832,065 A | * | 11/1998 | Bannister et al. ......... 379/93.08 |
| 5,893,053 A | * | 4/1999 | Trueblood .................... 702/187 |
| 5,915,003 A | * | 6/1999 | Bremer et al. ............ 379/93.19 |
| 5,969,500 A | * | 10/1999 | Ishikawa et al. ............. 318/807 |
| 6,041,335 A | * | 3/2000 | Merritt et al. ............... 715/512 |
| 6,072,479 A | | 6/2000 | Ogawa ......................... 345/302 |
| 6,072,832 A | * | 6/2000 | Katto ...................... 375/240.28 |
| 6,279,014 B1 | * | 8/2001 | Schilit et al. ................ 715/512 |
| 6,415,256 B1 | * | 7/2002 | Ditzik ......................... 704/231 |
| 6,437,818 B1 | * | 8/2002 | Ludwig et al. ........... 348/14.09 |
| 2002/0031243 A1 | * | 3/2002 | Schiller et al. ............. 382/119 |
| 2002/0107885 A1 | * | 8/2002 | Brooks et al. .............. 707/505 |
| 2002/0188943 A1 | * | 12/2002 | Freeman et al. ............... 725/38 |

* cited by examiner

Primary Examiner—Jayanti K. Patel
Assistant Examiner—Barry Choobin
(74) Attorney, Agent, or Firm—Lumen Intellectual Property Services, Inc.

(57) ABSTRACT

For a number of users is a system provided to create, edit, replay and view documents of free hand drawn sketches. The system captures the creation process together with verbal and/or visual information provided by each user and automatically correlates them for a later synchronized replay. The system provides a number of tools and features, mainly to: combine the sketching activity with existing images, to selectively retrieve media information correlated to individual sketch entities and to quasi simultaneously collaborate at a common document. The system architecture can by adjusted to various parameters in the communication infrastructure. The system may be implemented in any software program, a web based service, a web browser, an operating system for computers and/or communication devices.

69 Claims, 5 Drawing Sheets

SYSTEM AND METHOD FOR INDEXING, ACCESSING AND RETRIEVING AUDIO/ VIDEO WITH CONCURRENT SKETCH ACTIVITY

RELATED APPLICATION

This application is a continuation of the U.S. provisional patent application No. 60/133,782 filed on May 12, 1999, which is hereby incorporated by reference.

FIELD OF THE INVENTION

The invention relates to the field of communication methods. In particular, the invention relates to software for identifying sketch entities from sketch activity and for correlating media information to these sketch entities.

BACKGROUND OF INVENTION

Short-term communication between two or more distant people is typically performed on the audio level. A variety of telephone systems provide the proper tools for that type of communication.

To exchange more specific information, communication solely on the audio level becomes often unsatisfactory. Visual information in the form of graphics, pictures, sketches and the like are used to aid the information exchange.

In meetings, where people are physically together, visual information is shared by making it simultaneously visible to all participants. In addition, the participants are able to express themselves by using gestures or by drawing sketches.

Devices have been developed that provide shared visual information correlated to audio information. The goal of such devices is to enable people in distant locations, to communicate verbally and share visual information at the same time. The limited transmission capacity of public switched telephone networks (PSTN) reduces the feasibility of simultaneous audio and visual information exchange. The exchange of more detailed visual information like for instance pictures, graphics or sketches is not possible with such systems. Real time multi media communication devices (RTMMCD) that use the PSTN typically provide only a low resolution screen that is able to capture and transmit facial expression of a participant.

One major problem of multi media communication is the large variation in the data amount of the transmitted audio and visual information. These discrepancies occur because visual and verbal information are typically correlated in an information exchange event. As a result, high data amount of simultaneous audio and visual information intent to exceed the transmission capacities of the communication infrastructure. Since a signal distributed between a number of users via a PSTN can carry only a certain amount of information within a given time period, the transmission of visual and verbal information needs to be buffered to allow the transmission of more sophisticated visual information.

The buffering of the information is typically accomplished by independently saving audio information and/or video information. This buffering is accomplished temporally and/or permanently, at the location where the information is created and/or at a remote location. In a following step, the correlated information are transmitted chronologically with certain user definable parameter.

U.S. Pat. No. 4,656,654 to Dumas discloses a computer-assisted graphic teleconferencing method and apparatus that is designed for use with the PSTN. The method and apparatus described in the patent work according to the principles described in the paragraph above. The main disadvantage of this invention is that graphics and voice can be communicated only alternatingly. A simultaneous distribution of a sketching activity with the contemporaneous explanatory verbal information is not possible with this invention. In addition, the invention is not usable in combination with the Internet since no distribution system is described that may be implemented in a web page.

U.S. Pat. No. 5,801,757 to Saulsbury discloses an interactive communication device that allows simultaneous sending and receiving of audio and graphic information via a PSTN. The device uses techniques for compression, merging and coding of signals to accomplish the transmission. The patented device further uses techniques for decompressing, separating and decoding of signals to recreate the audio and graphic signals in their original form at the location of a receiver. The patented device is placed between the telephone line and the PC.

The device provides a possibility for simultaneous exchange of audio and graphical information. The main shortcoming of the device is that it needs to be physically installed in combination with a software program, which may result in problems of compatibility with existing hardware. Furthermore, it is not possible to communicate audio-graphically with a person that is not in possession of the device. The invention is also not usable in combination with the Internet since no distribution system is described that may be implemented in a web page.

U.S. Pat. No. 5,832,065 to Bannister et al. discloses a synchronous voice/data message system that allows the exchange of audio-graphic messages between specific portable communication devices also via a PSTN. The message system provides a replay function to display the creation process of the graphical information. In addition, the message system simultaneously replays the correlated verbal information. The chronological audio graphic information can be replayed at varying speeds. Unfortunately, the message system is one directional and chronological. It does not afford a recipient the option to selectively access segments of the chronologically retrieved message. It is not possible to communicate audio-graphically with a person that is not in possession of the portable communication device. Further, the invention is not usable in combination with the Internet since no distribution system is described that may be implemented in a web page.

U.S. Pat. No. 5,915,003 to Bremer et al. discloses a sketching unit for transmission of sketches and notes over normal telephone lines. The teaching of the patent is similar to that of Saulsbury. It utilizes in addition a specific sketching unit that allows creating and/or displaying graphic information. The patent further discloses a technique for a multiplexed transmission via a device that is switched between the telephone line and a computer. It is not possible to communicate audio-graphically with a person that is not in possession of the device. The invention is also not usable in combination with the Internet since no distribution system is described that may be implemented in a web page.

A communication medium that is gaining more and more significance is the Internet. A number of software products and web pages provide users possibilities to exchange audio and/or graphical information for the purpose of real time collaboration.

For instance, the RealityWave Inc. discloses on their web page www.realitywave.com a software product called VizStream that allows to create 3D graphics that can be embedded within a web page and accessed by the client. Even though the software provides an enhanced display technique, it limits the client to view a prepared information. Bi-directional information exchange on the basis of a common document is not possible with that technique. Further, Vizstream provides only the display of 3D models without any additional media information like, for instance, audio, video, or graphics.

On the web page www.solidworks.com a software program called "eDrawing" is presented, which allows to generate self extracting files that can be attached to emails. The self extracting files unfold into an interactive screen where 2D mechanical drawings can be viewed together with remarks and any other text or graphical information necessary to make the drawing understandable. eDrawing is also one-directional, which means that the client cannot add on his side to the contents of the information. Further, eDrawing provides no possibility to add verbal information to the drawing.

On the web page www.bluelineonline.com web site based service programs are introduced by the names of "ProjectNet", "ProjectNet LT" and "ProjectNet EPS". Among other services, the programs provide a number of clients engaged into the same project with the possibility to review simultaneously technical drawings. In addition, the programs enable the clients to add predetermined graphical symbols and explanatory text to the drawing. This added information is distributed to all other clients for the purpose of review.

Even though the programs greatly improve real time collaboration they restrict the clients to the use of predetermined graphical symbols together with written text.

Sophisticated information elements within a single displayed image and/or in a chronological context cannot be captured directly by the programs. In addition, the information is restricted to visual information that need to be manually added. No possibility to incorporate audio information is provided.

Therefore, there exists a need for a method and system to allow two or more person to communicate audio graphically without significant time delay, without the need for specific equipment and without limitations imposed by the transmission capacity of the available communication infrastructure. The present invention addresses this need.

OBJECTS AND ADVANTAGES

It is a primary object of the present invention to provide a method that allows a number of clients to freely document graphical information together with multi media information like, for instance, audio and/or video information.

It is a further object of the present invention to provide a method that captures the correlation between graphical and other multi media information for a chronological presentation at client locations.

It is another object of the present invention to provide a method that presents the captured graphical information and the correlated multi media information in a mode such that the client can select any graphical information element individually; by making the selection, the software should simultaneously replay the correlated multi media information element.

It is another object of the present invention to provide a method that allows to essentially simultaneously exchange information added to a graphical and multi media document between a number of clients.

In addition, it is an object of the present invention to provide a method that keeps a number of graphical and multi media documents independently available for review and modification by a number of clients.

Finally, it is an object of the present invention to provide the method in a form that allows it to be accessed by a number of clients via the internet and/or internet related services like for instance emailing.

SUMMARY

The present invention introduces a software program that allows clients to exchange,graphical information together with correlated multi media information. Correlated multi media information is primary verbal information and secondary video information.

The software program provides the exchange in a quasi simultaneous mode. Since real time information exchange is influenced by the transmission capacity of the communication infrastructure the software program provides a script log for each client and project. In the script log all events during the creation of a graphical and multi media document are temporally correlated. Further, the software program recognizes free created graphical entities by capturing the activities of input devices. An input device is, for instance, a mouse, a digitizer tablet, or a pointer of a touch screen.

The creation of a graphical entity begins typically with an initiation event performed by the user. This initiation event is performed with the down click of a mouse button or by bringing a pointer into contact with a touch screen. The creation of a graphical entity ends typically with an termination event performed by the user. This termination event is performed, for instance, with the release of the down held mouse button. The period between the initiation event and the termination event define the temporal boundary condition to combine a number of drawn line segments into a sketch entity. This definition system is applied in a basic and an advanced form with the result of sketch entities with varying complexities.

A video input device as for instance a video camera may capture in addition visual information correlated to the graphical information. The visual information is primarily provided by the user and may, for instance, be the facial expressions and gestures of the user or any other visual information correlated to the creation of the graphical information.

An audio input device as, for instance, a microphone captures audio information correlated to the graphical information. The audio information is primarily provided by the user in the form of verbal information.

Graphical, visual and audio information are time stamped, captured and stored. In the preferred embodiment of the invention, the storing is performed in the form of a dynamic script log on a direct-access storing medium like, for instance, a disk drive or the read active memory (RAM) of the users computer. As a result, the correlation of graphical, visual and audio information can be reconstructed.

Since verbal information is not necessarily synchronous with the period of each correlated initiation action, the invention recognizes bulks of audio information and correlates them to the corresponding sketch entities.

The Internet allows each individual user to retrieve and transmit information independent of the capacity of the communication infrastructure. In such a buffered transmission mode, the transmission capacity of the communication infrastructure solely influences the waiting time to send and/or retrieve the information. In correspondence with this buffered transmission mode, the present invention provides a buffered transmission mode, during which the created script log is transmitted to a central server and eventually broadcasted in a quasi real time mode that corresponds to the transmission capacity of the communication infrastructure.

The Internet also allows streaming information transmission during which the information is presented as it is received and/or created. Streaming transmission is utilized for instance for so-called chat rooms or streaming video. With increasing transmission capacity of the communication infrastructure, on which the Internet is based, streaming data transmission via the Internet becomes increasingly relevant. The present invention provides a streaming transmission mode, during which data is distributed between the number of participants as it is created.

The preferred system architecture of the present invention consists of one or more main server stations that can be accessed by the clients via a web page. Such a web page operates as a broadcasting site that receives and redistributes all information from the individual clients and/or participants. The web page provides an interactive graphical interface, in which the clients can replay, view, edit and/or create sketch information.

During the replay mode the creation process of a document can be replayed on the interactive graphical interface in a real time mode and/or in a temporally altered mode. Correlated audio and/or video information is replayed simultaneously.

During the viewing mode, individual sketch entities can be selected and the correlated audio and/or video information is replayed. Since sketch entities do not necessarily have media information associated with them, the invention provides an optional highlight mode. The highlight mode allows the reviewing client to visually recognize additional media information correlated to individual sketch entities.

During the editing mode, the client can add sketch information to a retrieved document. At the same time, the client can record audio and/or video information to contribute to collaborative creation of a document. The invention provides a selectable graphical vocabulary like, for instance, line fonts or colors that can be assigned to individual clients. As a result, each contribution can be correlated to its creator. The invention provides the possibility to either broadcast the collaborative editing in a quasi real time mode respectively a streamed real time mode and/or an off-time mode. During the off-time mode, individual participants may contribute at any time to the creation of the document. The invention provides thereby an information system that informs other participants about an update of a document under collaboration.

In addition, the interactive graphical interface a background display mode, during which graphical and/or pictographic images may be displayed. In doing so, clients are able to incorporate previously created documents like, for instance, blueprints, photographs, maps, snapshots and/or video frames.

In an alternate embodiment, a client may be provided with a software program of the present invention in the form of a self-extracting email message, and/or an installable program downloaded from a web page. The installable program may also be retrieved from a storage medium like, for instance, a Floppy Disk or a Compact Disk. As a result, the client is able to perform all operations of the present invention on his/her own computer without being connected to the Internet. In this embodiment, each client occasionally exchanges information either with a server station or directly with other clients to exchange all updates.

The present invention may further be part of an operating system that operates a computer and/or a communication device like, for instance, a cellular phone. The operating system may include the operation of a communication network.

The system architecture may be centralistic and/or equalized. In a centralistic system architecture a central server stores centrally the creations and activities of each individual client in a central log. In an equalized system architecture, each client stores the creations and activities of his/her own and other clients in a personal log. The clients personal log is updated during an update call to a central server performed during an update ring call to other clients. Update calls and update ring calls may be triggered by the client or automatically dependent on an available transmission capacity, or other definable parameters.

The invention and in particular the alternate embodiment may be applied to any communication system and particularly to a wireless communication system with inconsistent transmission capacities and arbitrary interruptions of connections.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Figure 1:
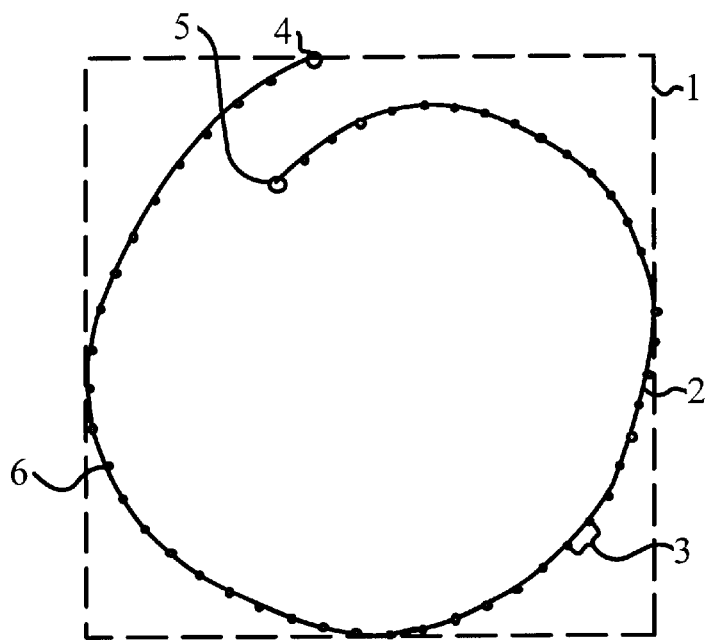
FIG. 1 shows an example of a basic sketch entity with a single initiation event and a single termination event.

In the present invention, a interactive graphical interface 52 (see FIGS. 5–7) is provided to a number of clients. The interactive graphical interface 52 allows clients C1–N, C2–N (see FIGS. 8, 9) to create freehand drawn sketch entities. The drawing process is captured in a real time manner such that simultaneously captured multi-media information can be precisely correlated. For example, the sketch entity is a curve 2 (see FIGS. 1, 2) represented by a number of connected line segments 3 (see FIGS. 1, 2). In the simplest case, the sketch entity consists of one curve 2. FIG. 1 shows an example of such a basic sketch entity.

Figure 3:
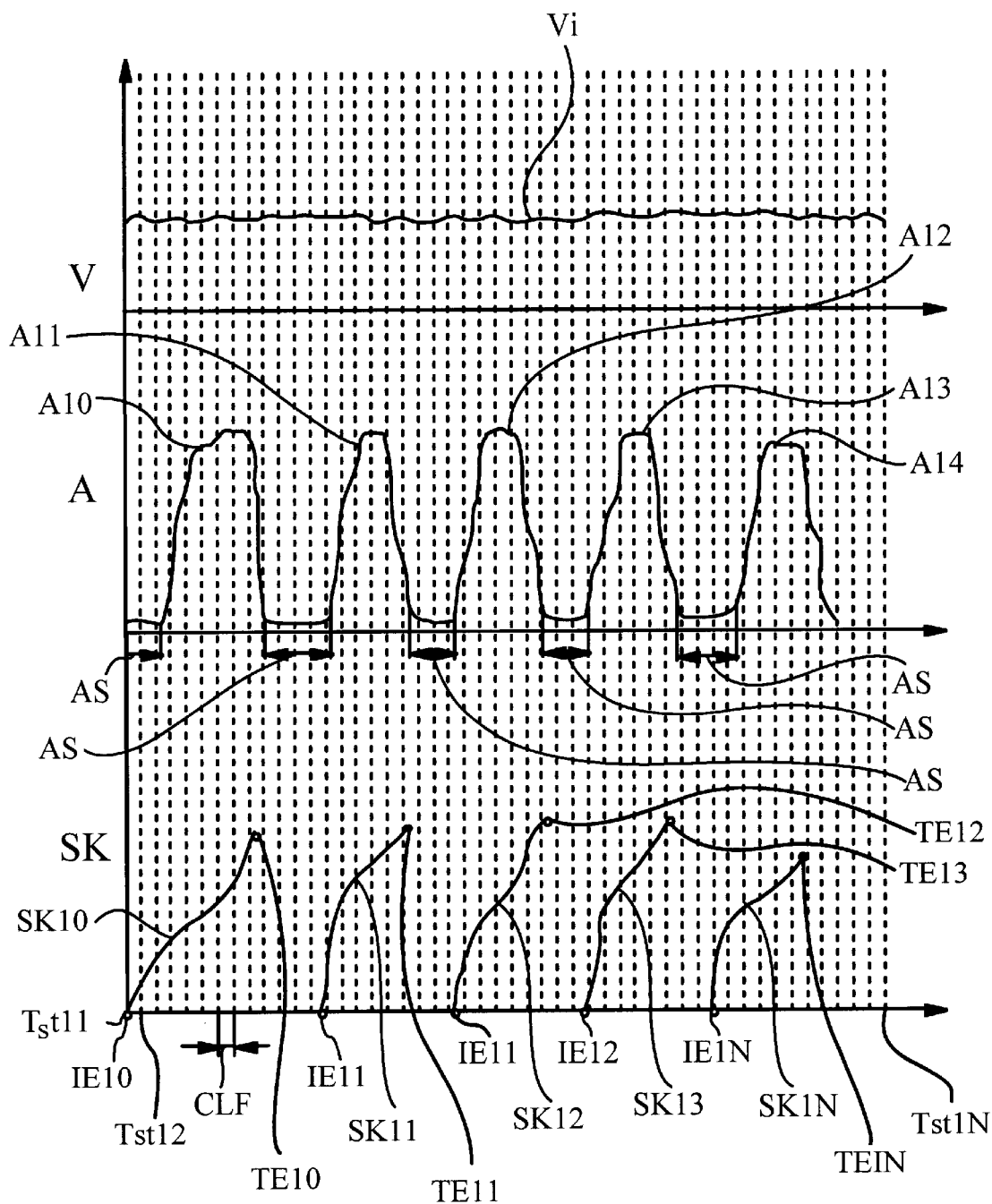
FIG. 3 shows an exemplary graph of a basic procedure to capture sketching activities and correlated media information.
Figure 4:
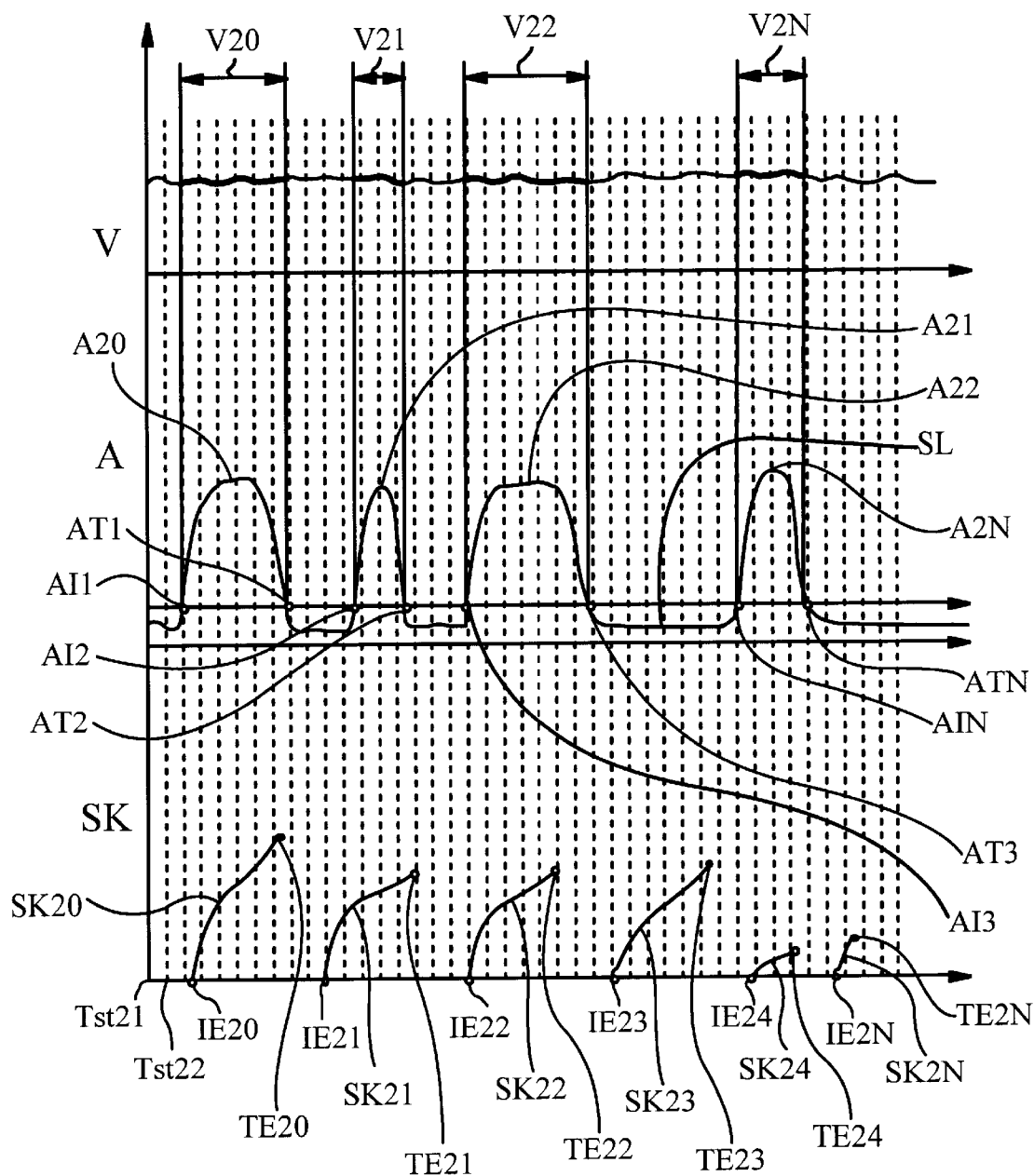
FIG. 4 shows an exemplary graph of an advanced procedure to capture sketching activities and correlated media information.

The real time capture of the sketch entity's creation process requires the utilization of time stamps Tst11–1N, Tst21–2N (see FIGS. 3, 4). Time stamps Tst11–1N, Tst21–2N have a clock frequency Clf (see FIG. 3) that may be defined: either by the clients operating system, or it may be a parameter that is uniformly defined for all clients. The clock frequency Clf is processed as a function of a computers internal clock and is preferably constant.

The creation process of the sketch entity commences with the initiation event IE10–N, IE20–N (see FIGS. 3, 4). The initiation event IE10–N, IE20–N is, for instance, the down click of a mouse button at the time, when the cursor is within the drawing area 51 (see FIGS. 5–7) of the interactive graphical interface 50. Dependent on the hardware that is used to create the drawing, the initiation event IE10–N, IE20–N may also be the contacting of a drawing pin with the surface of a touch screen or an activation click of a specified button of a digitizer board. In other words, the initiation event IE10–N, IE20–N may be any interaction of the client with any kind of input device that is feasible to recognize a predetermined initiation command. This applies also to a voice recognition system that is utilized to recognize verbal commands as a means to initiate predetermined functions of the present invention. The voice recognition system may be incorporated in the system of the present invention or may be an independent system incorporated in the client's computer.

In correspondence with the initiation event IE10–N, IE20–N the drawing of the curve 2 is initiated at the initiation point 4. The client's drawing movement is captured in sequences that correspond to the clock frequency Clf of the time stamps Tst11–1N, Tst21–2N. As a result, a progressive number of points 6 are created within the drawing area 51. The points 6 are connected by line segments 3.

The creation of the sketch entity is finished, when the client initiates the termination event TE10–N, TE20–N (see FIGS. 3, 4). The termination event TE10–N, TE20–N is, for instance, the release of a pressed mouse button. Dependent on the used hardware, the termination event TE10–N, TE20–N may also be the removal of a contacting drawing pin from the surface of a touch screen or a termination click of a specified button of a digitizer board. In other words, the termination event TE10–N, TE20–N may be any interaction of the client with any kind of input device that is feasible to recognize a predetermined termination command. This applies also to a voice recognition system that is utilized to recognize verbal commands as a means to initiate predetermined functions of the present invention. The voice recognition system may be incorporated in the system of the present invention or may be an independent system incorporated in the client's computer.

After the curve 2 has been created, the system analyzes the numeric values of the coordinates of points 6. During this analysis, the extreme values of the x and y coordinates are recognized. These extreme values are utilized by the system to create a boundary rectangle 1. The boundary rectangle 1 is defined to serve as a dummy object, which is utilized during the editing, viewing and replaying mode of the invention.

The clock frequency Clf defines in combination with the drawing speed the resolution of the curve 2. In other words, the faster the drawing speed for a given clock frequency Clf the longer the distance between individual points 6. The clock frequency Clf is adjusted to a feasible level that balances the average drawing speed at which clients create the sketch entities with a minimal required curve resolution.

A basic sketch entity is created as an independent element of a more complex free hand drawing and/or to encircle or underline a feature of a background image that is displayed by the system in the viewable area 51.

Figure 2:
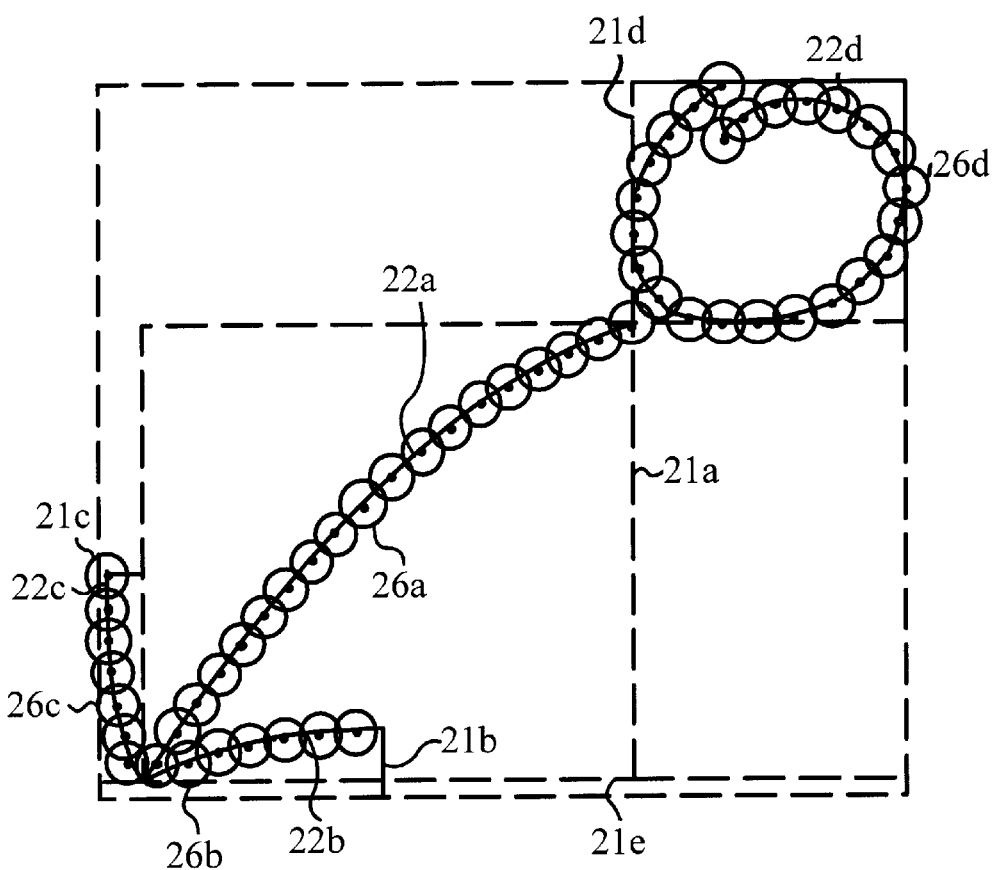
FIG. 2 shows an example of an advanced sketch entity with multiple initiation events and multiple termination events.

FIG. 2 shows an example of an advanced sketch entity. The system provides the possibility to create advanced sketch entities that consist of a number of combined curves 22a–d. Freehand drawings are typically created with a certain inaccuracy. To allow an automated combining of inaccurately drawn curves 22a–d, the system of the present invention assigns proximity areas 26a–d to the points 6. The proximity areas 26a–d are predetermined areas surrounding the points 6. The areal extension of the proximity areas 26a–d may be defined in a vector format or a coordinate format.

Proximity areas 26a–d are recognized in correlation to the curves 22a–d. As a result, proximity areas 26a–d that overlap with each other and do not belong to the same of the curves 22a–d trigger an automated combining of the correlated curves 22a–d. The size of the proximity areas 26a–d is defined in correlation to the maximal space between the points 6 such that a closed area in the vicinity of the curves 22a–d is covered by the proximity areas 26a–d.

The combining function may be activated as part of the system setup and/or individually by assigning the initiation event IE10–N, IE20–N to two separate initiation commands. In case of a mouse this may be, for instance, the down click of the right mouse button for the initiation event IE10–N, IE20–N with combining function and the down click of the left mouse button for the initiation event IE10–N, IE20–N without combining function.

It is noted that the dual assignment of initiation commands for the initiation event IE10–N, IE20–N may be applied to any other input device, including a voice recognition system.

The boundary rectangles 21a–d may be combined to the combined boundary rectangle 21e and/or remain as independent dummy objects.

The system may further provide automated geometric feature recognition to correlate standardized geometric elements to the freehand drawn curves. During the creation of complex freehand drawings, which consist of a number of basic and/or advanced sketch entities it is desirable to replace inaccurate geometric elements with computer generated accurate geometric elements. These computer generated accurate geometric elements may for instance be:

1) a straight line replacing the curves 2, 22a–d within a predetermined maximal curvature;
2) a horizontal line replacing the curves 2, 22a–d within a predetermined maximal aberration, deviating in y-direction relative to the initiation point 4;
3) a vertical line replacing the curves 2, 22a–d within a predetermined maximal aberration, deviating in x-direction relative to the initiation point 4;
3) an arc replacing the curves 2, 22a–d within a predetermined maximal curvature aberration over its length.

It is noted that the automated geometric feature recognition may be extended to recognize any free hand drawn geometric form and replace it with computer generated accurate geometric elements.

The automated feature recognition may be activated during the setup of the system or it may be independently activated with a feature recognition command. The feature recognition command can be incorporated, for instance as the handling variation of the input device. In case of a mouse as the input device, the handling variation may be a single down click for an initiation command without feature recognition and a double click for an initiation command including feature recognition.

During the creation of basic and/or advanced sketch entities, additional multi-media information may be captured. FIG. 3 is shown to explain the basic procedure of capturing sketching activities and correlated media information. The combined graph shows in its top section a video signal Vi, in its middle section the audio signals A10–N and in the bottom section the sketch activity curves Sk10–N.

The top vertical axis V corresponds to the signal density of the video signal Vi, the middle vertical axis A corresponds to the acoustic level of the audio signals A10–N, and the bottom vertical axis SK corresponds to the drawing path during the creation of the curves 2, 22a–d. Hence, the incline angle of the sketch activity curves Sk10–N corresponds to the drawing speed at which curves 2, 22a–d are created. The horizontal axis of the top, middle and bottom section represent the elapsed time.

The vertical raster lines that cover the top, middle and bottom section represent the time stamps Tst11–1N. The spacing between the vertical raster lines represent the clock frequency Clf.

During the creation process of the basic and/or advanced sketch entities the invention utilizes eventual computer features to record audio and video information. A conventional computer has hardware components like, for instance, a microphone and a sound card to capture and process audio information respectively a camera and a video card to capture and process video information. In combination with these hardware components, a computer is typically equipped with an operating system that is able to process and embed this audio and video information in application systems like the one of the present invention. Thus, a client, owning a conventional computer, needs only to perform an access procedure in order to utilize the system of the present invention.

An access procedure may be, for instance:
1) the access of a specific web page;
2) the down loading and extraction of an email message;
3) the activation of an operating system feature;
4) the down loading, extraction and/or execution of an email attachment; and/or
5) the installation of a software program from a tangible data storage medium like, for instance a Floppy Disk or a Compact Disk, and consequently activation of the installed software program.

To recognize later on the correlation of audio, video and sketching activities, the system assigns the time stamps Tst11–1N during the creation and/or editing mode simultaneously to the sketching activities and to the captured audio and video. Audio and video are continuously captured during the creation and/or editing mode. The audio signals A10–N are typically interrupted by silence periods AS. The audio signals A10–N represent preferably verbal information provided by the clients. Silence periods AS typically separate blocks of coherent verbal information.

The video signal Vi is typically a consistent stream of video data that corresponds in size and structure to the image resolution, the color mode, the compression ratio and the frames per time unit. The video signal may be a sequence of still images at a rate that the still images are recognized as still images or that they combine in a viewers mind to a continuous flow.

During the replay mode a selected document is replayed such that the individual sketch entities are automatically recreated in the drawing area 51. The automatic recreation is performed in a chronological manner. The audio signals A10–N and video signal Vi are replayed synchronously together with the recreation of the individual sketch entities.

During the viewing mode a selected document is displayed with all sketch entities. By performing a selection process, the client selects one or more individual sketch entities. A replay initiation routine analyzes all time stamps Tst11–1N correlated to the selected sketch entities and determines the earliest one. The earliest detected of the time stamps Tst11–1N is taken by the system to define a common starting moment for the video signal Vi and for the audio signals A10–N respectively the silence periods AS. Audio and Video continue until the next selection of one or more sketch entities is performed by the client. At that moment, the replay initiation routine is initiated again.

The selection process is defined by the system in the preferred form of a selection rectangle. The selection rectangle has to be created by the client by indicating two diagonal selection points within the drawing area 51. The selection rectangle selects the sketch entities by surrounding and/or intersecting with their correlated dummy objects.

In an alternate embodiment, the selection process is performed by initiating a selection command when the cursor is placed by the client within one of the proximity areas 26a–d. By doing so, the client is able to distinctively select singular sketch entities. The alternate embodiment is applied in cases of high densities of individual sketch entities within the drawing area 51.

To provide the client with confined media information correlated to one or more selected sketch entities, the system provides an advanced procedure to capture sketching activities and correlated media information. FIG. 4 is shown to explain the advanced procedure.

FIG. 4 corresponds with its elements mainly to those of FIG. 3. The audio signals A20–N are comparable to the signals A10–N, the sketch activity curves Sk20–N are comparable to the sketch activity curves Sk10–N. In addition to FIG. 3, FIG. 4 introduces a audio switching level shown in the middle section with the horizontal line Sl.

Block elements of media information are provided during the advanced procedure by recognizing only audio signals A20–N that are at a level above the switching level. During the creation of sketch entities the system captures audio signals A20–N between the audio initiation moments AI1–N and the audio termination moments AT1–N. The audio initiation moments AI1–N and the audio termination moments AT1–N share preferably the same switching level. It is noted that the invention applies also to the case, when the audio initiation moments AI1–N and the audio termination moments AT1–N are triggered at different switching levels.

In an audio assigning procedure, the system assigns the audio initiation moments AI1–N and the audio termination moments AT1–N to the closest of the time stamps Tst21–2N. These times stamps Tst21–2N are utilized to cut the corresponding video sequences V20–N out of the video signal Vi and to assign them to the correlated audio signals A20–N.

The creation of sketch entities takes place during the advanced procedure as it is described for the basic procedure.

After the multi-media blocks have been created by the system, a block assigning procedure is performed to assign the multi-media blocks to the correlated sketch entity dependent on their time relation. Time relations are, for instance:

1) the sketch entity fully overlapping a multi-media block;
2) the multi-media block fully overlapping a sketch entity;
3) the initiation event IE20 following the audio initiation moment AI1 and the termination event TE20 following the audio termination moment AT1;
4) the audio initiation moment AI3 following the initiation event IE22 and the audio termination moment AT3 following the termination event TE22;
5) the initiation event IE24, IE2N and/or the termination event TE24, T2N being below a minimal time span respectively below a minimal number of time stamps to the audio initiation moment AIN and/or the audio termination moment ATN.

The audio assigning procedure and the block assigning procedure may be performed with an approximation algorithm provided by the system either simultaneously at the time the creation mode respectively the editing mode is activated, or after the creation mode respectively the editing mode is terminated.

During the viewing mode, the advanced procedure allows the client to selectively witness the multi-media blocks that is correlated to the selected sketch entity. The system provides the client with an optional predetermined audio and/or video signature to inform him/her at the end of the correlated multi-media block. Hence, the advanced procedure prevents the client from accidentally witnessing multi-media information that does not relate to the selected sketch entity.

To provide the client with additional administrative information, the system optionally displays the individual sketch elements in varying styles. The administrative information is, for instance:

1) client identification correlated to individual sketch entities of a collaboratively created document;
2) information about available multi-media blocks for individual sketch entities contained in a document;
3) chronological creation of the sketch entities contained in a document.

Figure 5:
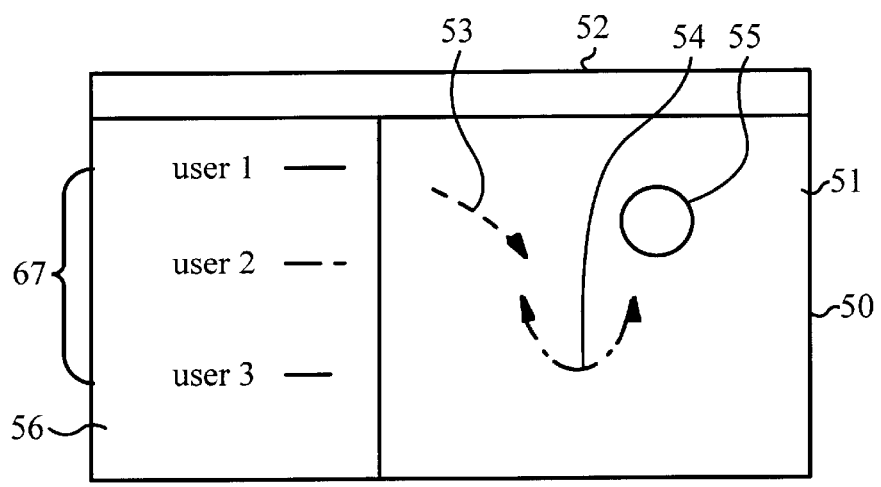
FIG. 5 shows a simplified example of a interactive graphical interface with sketch entities that are marked and correlated to client identities.
Figure 5:
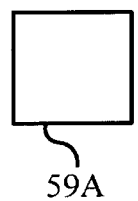
Figure 5:
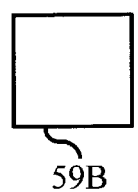
Figure 6:
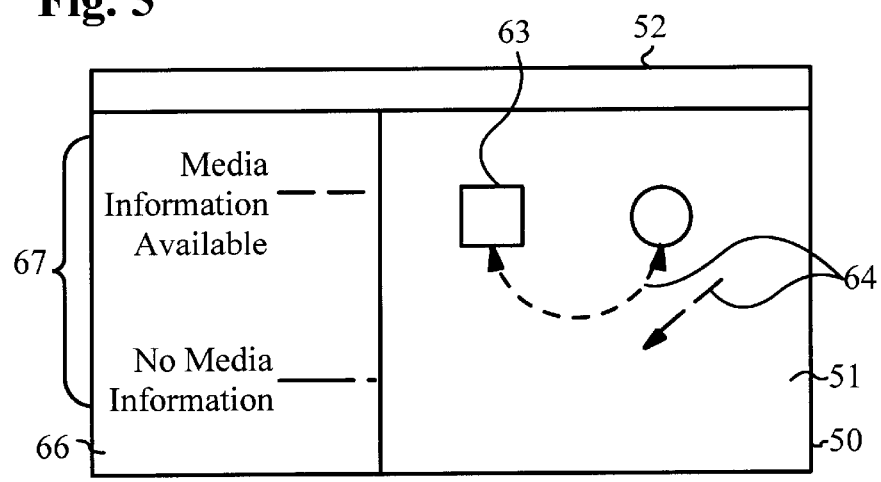
FIG. 6 shows a simplified example of a interactive graphical interface with sketch entities that are marked to visualize the availability of correlated multi-media information.
Figure 6:
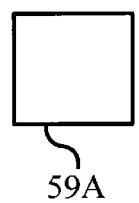
Figure 6:
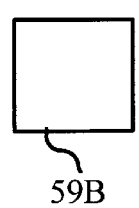
Figure 7:
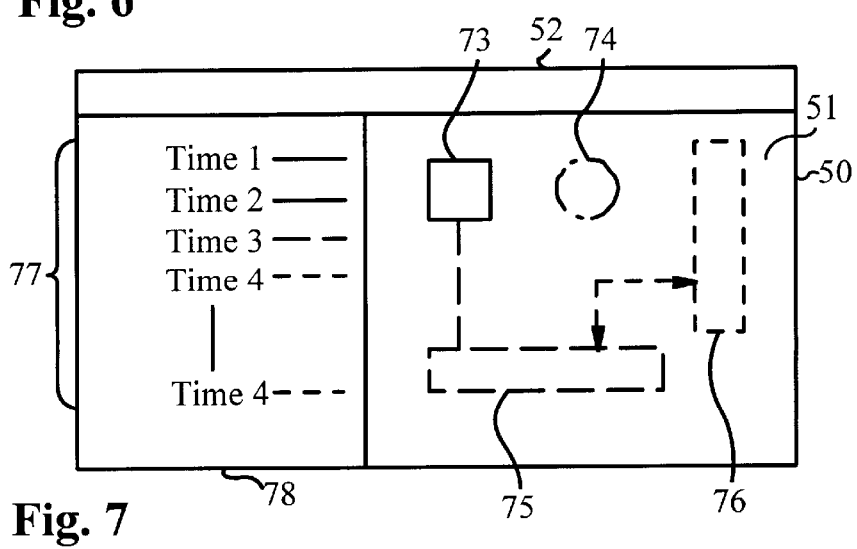
FIG. 7 shows a simplified example of a interactive graphical interface with sketch entities that are marked to visualize the chronological creation process of the sketch entities.
Figure 7:
Figure 7:

FIGS. 5, 6 and 7 show in that respect a simplified example of the interactive graphical interface 52 provided by the system together with examples of graphical coding of sketch entities according to the above listing.

In FIG. 5 the sketch entities 53, 54, 55 are shown with first graphical codes to mark them according to their creators client identification. In the example of FIG. 5, the graphical codes are varying line fonts. Graphical codes may be of any color, shape, symbolic contents and/or dynamic respectively static luminescence variations. In an optional first window 56, a collaborating client list 57 is displayed together with the assigned graphical codes.

In FIG. 6 the sketch entities 63 and 64 are shown with second graphical codes to mark them in case multi-media blocks are available. In the example of FIG. 6, the graphical codes are varying line fonts. Graphical codes may be of any color, shape, symbolic contents and/or dynamic respectively static luminescence variations. In an optional second window 66, a nomenclature 67 is displayed together with the assigned graphical codes. The second graphical codes may also be applied during the viewing mode to dynamically high light the sketch entity, whose multimedia block is replayed.

In FIG. 7 the sketch entities 73–76 are shown with third graphical codes to mark them according to their creation chronology. In the example of FIG. 7, the graphical codes are varying line fonts. Graphical codes may be of any color, shape, symbolic contents and/or dynamic respectively static luminescence variations. In an optional third window 78, a nomenclature 77 of the sketch entities is displayed together with the chronologically applied third graphical codes. The third graphical codes may be preferably designed with a fluent transition such that the chronology of the creation process can be easily recognized. Fluent transitions are, for instance:

1) the graduate change in the colors corresponding to the color spectrum;
2) the continuous dilution of dotted lines.

The system provides a variety of background images that may be displayed in the display area 51. Background images are preferably pictographic images like, for instance:

1) photographs;
2) scans of graphics and/or blueprints;
3) scans of text;
4) snapshots of videos.

It is noted that the system may also include background images in vector format as they are known to those skilled in the art for CAD drawings.

Background images may be imported at the beginning and/or at any time during the creation of a new document or under laid behind an existing creation of sketch entities.

In an alternate embodiment, the system utilizes the computers video capturing capability to retrieve snapshots of the displayed video and to provide the snapshots as background images. The snapshot retrieval function is preferably activated during the creation mode. The snapshot is taken by the client C1–N, C2–N by performing a snapshot capturing command, which is simultaneously performed during the real time display of the displayed video. A snapshot capturing command may for instance be a mouse click at the moment the cursor is placed within the video display screen 59A.

The snapshot retrieval function allows the client C1–N, C2–N to comment in a quasi simultaneous way a captured video. Hence, the snapshot retrieval function is particular feasible to combine a live visual experience with a documentation procedure. Applications for the snapshot retrieval function are, for instance, inspection of construction sites.

FIG. 5–7 further show the optional video display screen 59A and the optional audio control screen 59B. Video display screen 59A and the audio control screen 59B are conventionally provided by the operating system and may be controlled by the system of the present invention. It is noted that the video display screen 59A and/or the audio control screen 59B may be provided by the system of the present invention.

The video display screen 59A displays, for instance:

1) the video information as it is recognized by the computers camera;
2) the video signal Vi as it is captured during the creation mode;
3) the video signal Vi during a continuous replay;
4) the video signal Vi during the replay of a selected multi-media block;
5) the snapshot retrieved with the snapshot retrieval function.

The audio control screen 59B performs functions, as they are commonly known to control the recording and replay of audio data on a computer. The audio control screen 59B is typically provided by the operating system and may be controlled by the system of the present invention.

The system provides a number of standardized commandos to perform tasks like, for instance, opening, printing, viewing and scrolling a document. The standardized commandos are commonly known for computer programs.

Figure 8:
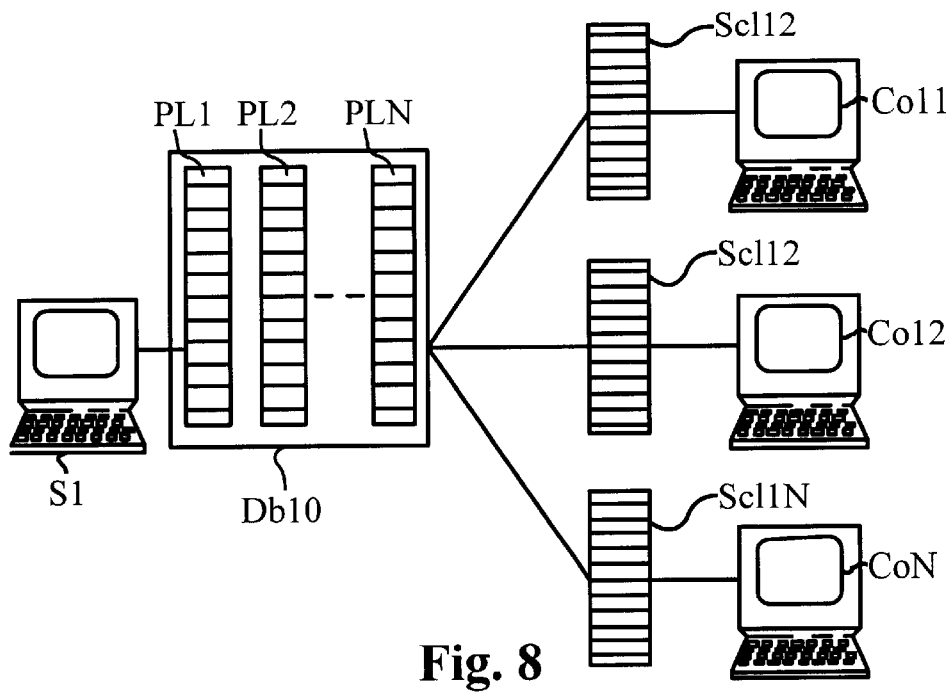
FIG. 8 shows the simplified system architecture for a centralistic distribution system.
Figure 9:
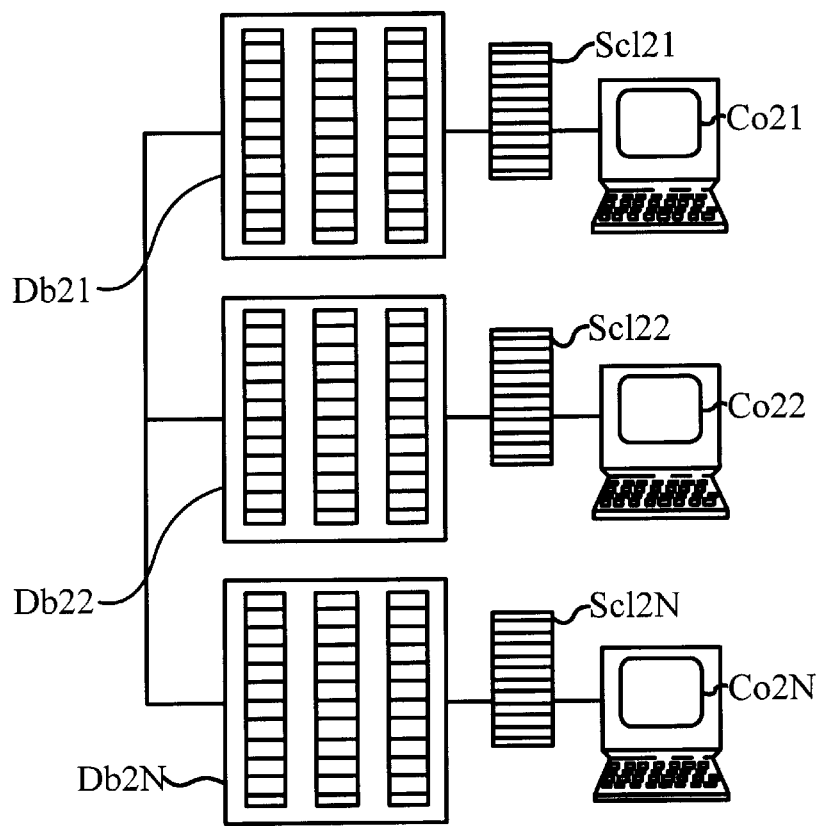
FIG. 9 shows the simplified system architecture for an equalized distribution system.

FIG. 8 and 9 show two different system architectures for the present invention. FIG. 8 shows the preferred embodiment of a centralistic system architecture incorporated in a web page distribution system. A server S1 operates a web page, which is accessible by a number of clients C11–1N.

After the client C111 has performed an identification routine, the client C111 is able to access the interactive graphical interface 52. A processing program that provides the creating, editing, replay and viewing modes becomes available.

The processing program enables the computer Co11 to create and store the script logs Scl1–N. The script logs Scl1–N contain all data gathered during the creation mode respectively during the editing mode. The computer Co11 is in bi-directional communication with the server S1, which stores the script log Scl1 in a permanent log Pl.

The permanent log Pl is the computer readable representation of the creation process of a document. It is continuously updated with all scrip logs Scl1–SclN that are created on the computers Co11–Co1N. A database Db10 maintained by the server S1 stores the permanent logs Pl of a number of documents created and edited by the clients C11–C11N. Hence, the server S1 is the central storing and redistribution site for all documents.

In case, a client C1 wants to retrieve a document for the purpose of viewing or editing, he/she initiates a retrieval request command. The retrieval request command prompts the interactive graphical interface 52 to provide the client C11 access the database Db10. After making a selection, the requested document is transmitted in the form of the permanent log Pl to the computer Co11 and becomes accessible for replay, editing and viewing. All changes are documented in an additional script log Scl11–SclN that is sent back to the server S1, where the newly created script log Scl11–SclN is added to the already existing permanent log.

Erasing activity may be captured as a regular part of the creation process and/or removed from the script log and the permanent log during the editing mode. The creation mode further provides a rewind function to allow the user to rewind and erase the captured creation process up to a chosen moment and to start over again.

The script logs Scl11–SclN may be transmitted to the server S1 continuously during the creation mode respectively during the editing mode and/or after these modes are ended.

The centralistic system architecture may be applied to any form of network wherein the clients C11–C11N can logon at any time to the server S1. Further, the centralistic system architecture may consist out of a number of servers S1 that compare and update the context of their database Db10 independently of the operation of the computers C11–C1N.

In an alternate embodiment, the system operates with an equalized system architecture as shown in FIG. 9. In the case of the equalized system architecture, each of a number of clients C21–C2N operates independently a computer Co21–Co2N, which maintains independently a database Db21–Db2N. The databases Db21–Db2N are stored on a first direct access storage device (FDASD). The databases Db21–Db2N contain a number of permanent logs Pl21–Pl2N, which are created, accessed, edited and maintained as described under FIG. 8. The processing program that provides the interactive graphical interface 52 and the functional operation of the system, as described above, is permanently stored on a second direct access storing device (SDASD) of the computers Co21–Co2N.

The storage medium of the SDASD and/or the FDASD may be a removable storage medium like, for instance, a CD or it may be incorporated in the computers Co21–Co2N as it is the case, for instance, in a hard disk drive.

Whenever a client C21 establishes a communication connection to another client C22–C2N, the clocks of each client C21–C2N are verified for synchronicity and eventual synchronized. Then, the databases Db21–Db2N are automatically compared and updated by the system. The equalized system architecture allows the clients C21–C2N to operate the system independently of an available communication connection. Hence, the equalized system architecture is particularly feasible in combination with wireless communication systems.

The centralistic and the equalized system architecture may be combined temporarily or in any other feasible scheme to combine the specifics of each system architecture.

The centralistic system architecture and the equalized system architecture provide two communication modes:

1) a time independent communication mode;

2) a quasi real time communication mode.

A time independent communication mode is favorably utilized in combination with the equalized system architecture, whereas the quasi real time communication mode is favorably utilized in combination with the centralistic system architecture.

During the time independent communication mode each of the clients C11–C1N, C21–C2N works at a document at any time. The script logs Scl11–Scl1N, Scl21–Scl2N are correspondingly created at any time. Hence, the system performs a low level script log distribution management during the time independent communication mode.

During the quasi real time communication mode the system has to perform a high level script log distribution management to reduce time delays in the distribution process between the clients C11–C1N, C21–C2N. During the high level script log distribution management the system performs an automated ranking of data priorities. Data with low priority respectively less significance for a quasi real time collaboration is transmitted after high priority data has been transmitted.

The system keeps track of various operating parameters that are necessary to operate under the conditions described above. These operating parameters are known to those skilled in the art. Operating parameters include, for instance, user identification, file conversion, application version.

The functional components of the inventive system are written in a computer readable code. Various software development systems provide the tools to create the computer readable code of the inventive system in accordance to the possibilities and needs of the used operating system. The code may be written, for instance, in the commonly known computer language Java. To facilitate the encoding and distribution of the present invention under a Windows operating system, an exemplary development system may, for instance, be Netshow.

The databases Db10, Db21–Db2N and/or the processing program may be installable on the computers Co11–Co1N, Co21–Co2N in the form of:

1) a downloadable file accessible via a web page;

2) a self extracting file attached or part of an an email message;

3) incorporated in a web browser;

4) incorporated in an operating system;

5) a computer readable file stored on a tangible medium like for instance a Compact Disk.

Accordingly, the scope of the invention should be determined by the following claims and their legal equivalents.

What is claimed is:

1. A system for identifying sketch entities from captured sketching activity and correlating said sketch entities with media information, said media information being simultaneously captured with said sketching activity, said system comprising:
   a) a drawing recognition means for capturing drawing movements of said sketching activity;
   b) an input recognition means for capturing initiation events and termination events of said sketching activity;
   c) a time stamping means for time stamping said sketching activity and said media information;
   d) a processing means for said identifying of said sketch entities;
   e) a database for storing a number of permanent logs;
   f) a script log for storing all data of each document created on one of a number of user units; and
   g) a distribution means for distributing said permanent logs and one or more script logs between said database and said number of user units.

2. The system of claim 1, wherein said system further comprises:
   a computer product comprising a computer readable medium carrying computer-executable program code for providing:
   I) said drawing recognition means;
   II) said input recognition means;
   III) said time stamping means;
   IV) said processing means;
   V) an interactive graphical interface;
   VI) a creating mode;
   VII) an editing mode;
   VIII) a replay mode;
   IX) a viewing mode; and
   X) said script log.

3. The system of claim 2, wherein at least one of said number of user units is a computer.

4. The system of claim 2, wherein at least one of said number of user units is a communication device.

5. The system of claim 4, wherein said communication device is a wireless communication device.

6. The system of claim 2, wherein said system further comprises a server.

7. The system of claim 6, wherein said database is maintained by said server.

8. The system of claim 2, wherein said media information contains an audio-signal.

9. The system of claim 2, wherein said media information contains a video-signal.

10. The system of claim 2, wherein at least one of said sketch entities is started with one of said initiation events and is ended with one of said termination events.

11. The system of claim 10, wherein at least one of said initiation events defines a replay starting moment of said media information.

12. The system of claim 2, wherein said script log contains a creating history of said document created on one of said number of user units.

13. The system of claim 2, wherein at least one of said number of permanent logs contains said creating history of one or more of said number of user units.

14. The system of claim 2, wherein said script log contains an editing history of said document, said document being edited on one of said number of user units.

15. The system of claim 2, wherein at least one of said number of permanent logs contains said editing history of one or more of said number of user units.

16. The system of claim 2, wherein said distribution system is a centralistic distribution system.

17. The system of claim 16, wherein said centralistic distribution system is based on a web page.

18. The system of claim 17, wherein said program code is provided on at least one of said user units via said web page.

19. The system of claim 2, wherein said program code is part of a web browser.

20. The system of claim 2, wherein said program code is part of an operating system, said operating system operating at least one of said user units.

21. The system of claim 2, wherein said program code is a self extracting file transmitted to at least one of said user units.

22. The system of claim 21, wherein said self extracting file is in an email attachment.

23. The system of claim 2, wherein said program code is stored in the form of a computer readable code on a direct access storage device of at least one of said user units.

24. The system of claim 2, wherein said program code further provides a background image on said interactive graphical interface.

25. The system of claim 24, wherein said background image is a snapshot derived from said video signal.

26. The system of claim 2, wherein said distribution system is an equalized distribution system.

27. The system of claim 26, wherein said database is stored in form of multiple representations on a number of direct access storage devices of a number of said user units.

28. The system of claim 2, wherein said system provides a time independent communication mode.

29. The system of claim 28, wherein said system provides a low level script log distribution management.

30. The system of claim 2, wherein said system provides a quasi real time communication mode.

31. The system of claim 30, wherein said system provides a high level script log distribution management.

32. A system for identifying sketch entities from captured sketching activity and for identifying media blocks from captured media information, said media information being simultaneously captured with said sketching activity, said system comprising:
   a) a drawing recognition means for capturing drawing movements of said sketching activity;
   b) an input recognition means for capturing initiation actions and termination actions of said sketching activity;
   c) an audio level recognition means for recognizing an audio initiation moment and an audio termination moment;
   d) a time stamping means for time stamping said sketching activity and said media information;
   e) a processing means for said identifying of said sketch to entities and of said media blocks;
   f) a database for storing a number of permanent logs;
   g) a script log for storing all data of each document created on one of a number of user units; and
   h) a distribution means for distributing said permanent logs and one or more script logs between said database and said number of user units.

33. The system of claim 32, wherein said system further comprises:
  a computer product comprising a computer readable medium carrying computer-executable program code for providing:
  I) said drawing recognition means;
  II) said input recognition means;
  III) said time stamping means;
  IV) said processing means;
  V) an interactive graphical interface;
  VI) a creating mode;
  VII) an editing mode;
  VIII) a replay mode;
  IX) a viewing mode;
  X) said script log.

34. The system of claim 33, wherein at least one of said number of user units is a computer.

35. The system of claim 33, wherein at least one of said number of user units is a communication device.

36. The system of claim 35, wherein said communication device is a wireless communication device.

37. The system of claim 33, wherein said system further comprises a server.

38. The system of claim 37, wherein said database is maintained by said server.

39. The system of claim 33, wherein said media information contains an audio-signal.

40. The system of claim 33, wherein said media information contains a video-signal.

41. The system of claim 33, wherein at least one of said sketch entities is started with one of said initiation events and is ended with one of said termination events.

42. The system of claim 41, wherein at least one of said initiation events is in block correlation to said audio initiation moment and at least one of said termination events is in block correlation to said audio termination moment of said media block, wherein said audio initiation moment is in level correlation to a first noise switching level, and wherein said audio termination moment is in level correlation to a second noise switching level.

43. The system of claim 42, wherein said block correlation and said level correlation is processed by an approximation algorithm.

44. The system of claim 33, wherein said script log contains a creating history of said document created on one of said number of user units.

45. The system of claim 33, wherein at least one of said number of permanent logs contains said creating history of one or more of said number of user units.

46. The system of claim 33, wherein said script log contains an editing history of said document, said document being edited at one of said number of user units.

47. The system of claim 33, wherein at least one of said number of permanent logs contains said editing history of one or more of said number of user units.

48. The system of claim 33, wherein said distribution system is a centralistic distribution system.

49. The system of claim 48, wherein said centralistic distribution system is based on a web page.

50. The system of claim 49, wherein said program code is provided on at least one of said user units via said web page.

51. The system of claim 33, wherein said program code is part of a web browser.

52. The system of claim 33, wherein said program code is part of an operating system, said operating system operating at least one of said user units.

53. The system of claim 33, wherein said program code is a self extracting file transmitted to at least one of said user units.

54. The system of claim 53, wherein said self extracting file is in an email attachment.

55. The system of claim 33, wherein said program code is stored in the form of a computer readable code on a direct access storage device of at least one of said user units.

56. The system of claim 33, wherein said program code further provides a background image on said interactive graphical interface.

57. The system of claim 56, wherein said background image is a snapshot derived from said video signal.

58. The system of claim 33, wherein said distribution system is an equalized distribution system.

59. The system of claim 58, wherein said database is stored in form of multiple representations on a number of direct access storage devices of a number of said user units.

60. The system of claim 33, wherein said system provides a time independent communication mode.

61. The system of claim 60, wherein said system provides a low level script log distribution management.

62. The system of claim 33, wherein said system provides a quasi real time communication mode.

63. The system of claim 62, wherein said system provides a high level script log distribution management.

64. A method for identifying a sketch entity from captured sketching activity and correlating said sketch entity with a media information, said media information being simultaneously captured with said sketching activity, said method comprising the steps of:
  a) time stamped capturing an initiation event of said sketching activity;
  b) time stamped capturing drawing movements of said sketching activity;
  c) time stamped capturing a termination event of said sketching activity;
  d) simultaneously time stamped capturing said media information; and
  e) identifying said sketch entity from said initiation event and said termination event;
  f) storing all data of each document created on one of a number of user units;
  g) storing a number of documents in a database; and
  h) distributing said number of documents between said database and said number of user units.

65. The method of claim 64, whereby said media information is an audio information.

66. The method of claim 64, whereby said media information is a video information.

67. A method for identifying a sketch entity from captured sketching activity and for identifying a media block from captured media information, said media information being simultaneously captured with said sketching activity, said method comprising the steps of:
  a) time stamped capturing an initiation event of said sketching activity;
  b) time stamped capturing drawing movements of said sketching activity;
  c) time stamped capturing a termination event of said sketching activity;
  d) simultaneously time stamped capturing an audio initiation moment;
  e) simultaneously time stamped capturing said media information;
  f) simultaneously time stamped capturing an audio termination moment;
  g) identifying said media block from said audio initiation moment and said audio termination moment;
  h) identifying said sketch entity from said initiation event and said termination event; and i) correlating said sketch entity to said media block;
j) storing all data of each document created on one of a number of user units;
k) storing a number of documents in a database; and
l) distributing said number of documents between said database and said number of user units.

68. The method of claim 67, whereby said media information is an audio information.

69. The method of claim 67, whereby said media information is a video information.

* * * * *